United States Patent
Konuma et al.

(10) Patent No.: US 12,258,488 B2
(45) Date of Patent: Mar. 25, 2025

(54) FILM-FORMING TREATMENT LIQUID

(71) Applicant: OKUNO CHEMICAL INDUSTRIES CO., LTD., Osaka (JP)

(72) Inventors: Taro Konuma, Osaka (JP); Teruhiko Kagehisa, Osaka (JP); Masafumi Nozaki, Osaka (JP); Katsumasa Shimahashi, Osaka (JP); Takashi Kato, Osaka (JP)

(73) Assignee: OKUNO CHEMICAL INDUSTRIES CO., LTD., Osaka (JP)

( * ) Notice: Subject to any disclaimer, the term of this patent is extended or adjusted under 35 U.S.C. 154(b) by 717 days.

(21) Appl. No.: 16/608,001

(22) PCT Filed: May 28, 2018

(86) PCT No.: PCT/JP2018/020267
§ 371 (c)(1),
(2) Date: Oct. 24, 2019

(87) PCT Pub. No.: WO2019/017073
PCT Pub. Date: Jan. 24, 2019

(65) Prior Publication Data
US 2021/0102076 A1    Apr. 8, 2021

(30) Foreign Application Priority Data

Jul. 19, 2017 (JP) ................. 2017-139966

(51) Int. Cl.
| | | |
|---|---|---|
| C09D 5/08 | (2006.01) | |
| C09D 7/63 | (2018.01) | |
| C09D 183/04 | (2006.01) | |
| C23C 22/48 | (2006.01) | |
| C23C 22/68 | (2006.01) | |
| C23C 22/78 | (2006.01) | |
| C23F 1/14 | (2006.01) | |

(52) U.S. Cl.
CPC ............. *C09D 5/08* (2013.01); *C09D 7/63* (2018.01); *C09D 183/04* (2013.01); *C23C 22/48* (2013.01); *C23C 22/68* (2013.01); *C23C 22/78* (2013.01); *C23F 1/14* (2013.01)

(58) Field of Classification Search
None
See application file for complete search history.

(56) References Cited

U.S. PATENT DOCUMENTS

| | | | | |
|---|---|---|---|---|
| 5,021,489 A | * | 6/1991 | Knight | ............. C09D 5/08 427/388.5 |
| 5,326,594 A | | 7/1994 | Sabata et al. | |
| 5,783,622 A | * | 7/1998 | Sabata | ............. B05D 7/51 428/623 |
| 6,147,156 A | * | 11/2000 | Yamaya | ............. C09D 183/10 524/588 |
| 7,588,801 B2 | | 9/2009 | Endo et al. | |
| 9,650,521 B1 | | 5/2017 | Kato et al. | |
| 2001/0002286 A1 | * | 5/2001 | Madigan | ............. B05D 3/068 427/551 |
| 2006/0166013 A1 | | 7/2006 | Endo et al. | |
| 2008/0102212 A1 | | 5/2008 | Endo et al. | |

FOREIGN PATENT DOCUMENTS

| | | | |
|---|---|---|---|
| CN | 1834178 A | | 9/2006 |
| CN | 102399372 A | | 4/2012 |
| JP | S63-102929 A | | 5/1988 |
| JP | 9-268383 A | | 10/1997 |
| JP | H10-1786 A | | 1/1998 |
| JP | H11-036080 A | | 2/1999 |
| JP | 2002-371380 A | | 12/2002 |
| JP | 2004-010998 A | | 1/2004 |
| JP | 2004002958 A | * | 1/2004 |
| JP | 2005-153168 A | | 6/2005 |
| JP | 2007-277690 A | | 10/2007 |
| JP | 2009-190369 A | | 8/2009 |
| JP | 2012-36469 A | | 2/2012 |
| JP | 2014-101585 A | | 6/2014 |
| JP | 2015-134942 A | | 7/2015 |
| JP | 2017-8338 A | | 1/2017 |
| JP | WO2015/029259 A | * | 3/2017 ........... C09D 133/14 |

OTHER PUBLICATIONS

JP2015134942EnglishMachineJPO (2015).*
English machine translation of JP2004002958 (2004).*
Wada & Koike—JPWO 2015-029259 A1—MT—metal coating—2015 (Year: 2015).*
Extended (Supplementary) European Search Report dated May 12, 2021, issued in counterpart EP Application No. 18835964.0. (8 pages).
Office Action dated Aug. 4, 2021, issued in counterpart CN Application No. 201880029049.6, with machine translation. (20 pages).
Surface technology manual, Nikkan Kogyo Shimbun, 1998, first edition 1 printing, pp. 688-689, with partial translation, cited in JP Office Action dated Sep. 28, 2021. (8 pages).
Office Action dated Sep. 28, 2021, issued in counterpart JP Application No. 2019-530905, with machine translation. (42 pages).
Office Action dated Jul. 28, 2020, issued in counterpart JP Application No. 2019-530905, with English translation (9 pages).
International Search Report dated Aug. 7, 2018, issued in counterpart International Application No. PCT/JP2018/020267 (1 page).

* cited by examiner

*Primary Examiner* — John Vincent Lawler
(74) *Attorney, Agent, or Firm* — WHDA, LLP

(57) ABSTRACT

An object of the present invention is to provide a treatment liquid and a treatment method that are capable of enhancing the corrosion resistance of a metal material. This object is achieved by, after forming a chemical conversion treatment film on the surface of a metal material, forming a film using a film-forming treatment liquid, the treatment liquid comprising: a silicon compound containing at least one member selected from the group consisting of alkoxysilyl, alkoxysilylene, and a siloxane bond; an organometallic compound; and water.

8 Claims, No Drawings

FILM-FORMING TREATMENT LIQUID

TECHNICAL FIELD

The present invention relates to a film-forming treatment liquid for a metal material having a chemical conversion treatment film; a film formation method; a film-comprising metal material; and the like.

BACKGROUND ART

As methods for imparting corrosion resistance to materials of various metals, such as zinc, aluminum, magnesium, cobalt, nickel, iron, copper, tin, gold, and alloys thereof, the materials are subjected to a chemical conversion treatment with chromium; an anodic oxidation treatment; or a surface treatment such as top coating (Patent Literature (PTL) 1 to 6). However, the level of corrosion resistance required of the metal materials described above has been increasing, and the methods described above are insufficient to meet the required corrosion resistance.

CITATION LIST

Patent Literature

PTL 1: Japanese Unexamined Patent Publication No. 2007-277690
PTL 2: Japanese Unexamined Patent Publication No. 2012-36469
PTL 3: Japanese Unexamined Patent Publication No. 2014-101585
PTL 4: Japanese Unexamined Patent Publication No. 2002-371380
PTL 5: Japanese Unexamined Patent Publication No. 2015-134942
PTL 6: Japanese Unexamined Patent Publication No. 2017-8338

SUMMARY OF INVENTION

Technical Problem

An object of the present invention is to provide a treatment liquid and a treatment method that are capable of enhancing the corrosion resistance of a metal material. Preferably, an object of the present invention is to provide a treatment liquid and a treatment method that are capable of enhancing the corrosion resistance of a metal material, while forming a thinner film by the treatment. More preferably, an object of the present invention is to provide a treatment liquid and a treatment method that are capable of enhancing the corrosion resistance of a metal material having a chemical conversion treatment film on the surface thereof.

Solution to Problem

The present inventors conducted extensive research in view of the above problems. As a result, the inventors found that the above objects can be achieved by, after forming a chemical conversion treatment film on the surface of a metal material, forming a film using a film forming treatment liquid comprising: a silicon compound containing at least one member selected from the group consisting of alkoxysilyl, alkoxysilylene, and a siloxane bond; an organometallic compound; and water. The inventors have accomplished the present invention as a result of further research based on this finding.

Specifically, the present invention includes, for example, the following embodiments.

Item 1. A film-forming treatment liquid for a metal material having a chemical conversion treatment film, the treatment liquid comprising:
  a silicon compound containing at least one member selected from the group consisting of alkoxysilyl, alkoxysilylene, and a siloxane bond;
  an organometallic compound; and
  water.

Item 2. The treatment liquid according to Item 1, wherein the chemical conversion treatment film is at least one member selected from the group consisting of a silicic acid conversion treatment film, a trivalent chromium conversion treatment film, a zirconium conversion treatment film, and a phosphoric acid conversion treatment film.

Item 3. The treatment liquid according to Item 1 or 2, wherein the chemical conversion treatment film is a silicic acid conversion treatment film.

Item 4. The treatment liquid according to any one of Items 1 to 3, wherein the silicon compound comprises a resin.

Item 5. The treatment liquid according to Item 4, further comprising at least one member selected from the group consisting of alkoxysilanes, alkoxysilane oligomers, and non-silicon resins.

Item 6. The treatment liquid according to any one of Items 1 to 5, wherein the metal of the organometallic compound is at least one member selected from the group consisting of titanium, zirconium, aluminum, and tin.

Item 7. The treatment liquid according to any one of Items 1 to 6, wherein the organometallic compound content is 0.01 to 50 parts by mass, relative to 100 parts by mass of the silicon compound.

Item 8. The treatment liquid according to any one of Items 1 to 7, wherein the water content is 1 to 100 parts by mass, relative to 100 parts by mass of the silicon compound.

Item 9. A film formation method comprising
  step D of applying the treatment liquid according to any one of Items 1 to 8 to a metal material having a chemical conversion treatment film.

Item 10. The formation method according to Item 9, further comprising
  step C of applying a chemical conversion treatment liquid to the metal material before step D.

Item 11. The formation method according to Item 10, further comprising
  step A etching the surface of the metal material before step C.

Item 12. The formation method according to Item 11, further comprising
  step B of desmutting the metal material between step A and step C.

Item 13. The formation method according to any one of Items 9 to 12, further comprising
  step E of curing after step D.

Item 14. The formation method according to Item 13, wherein the curing is a heat treatment.

Item 15. A film-comprising metal material comprising
  a metal material,
  a film 1 on the metal material, and
  a film 2 on the film 1,
wherein the film 1 is a chemical conversion treatment film, and the film 2 is a film comprising a crosslinked structure of a silicon compound comprising at least one member selected from the group consisting of alkoxysilyl, alkoxysilylene, and a siloxane bond, and an organometallic compound.

Advantageous Effects of Invention

According to the present invention, there can be provided a treatment liquid and a treatment method that are capable of enhancing the corrosion resistance of a metal material. Further, the present invention can provide a film-comprising metal material obtainable by the treatment method.

DESCRIPTION OF EMBODIMENTS

In the present specification, the terms "comprise" and "contain" include the concepts of "comprise," "contain," "substantially consist of," and "consist of."

The present invention relates to a film-forming treatment liquid for a metal material having a chemical conversion treatment film, the treatment liquid comprising: a silicon compound containing at least one member selected from the group consisting of alkoxysilyl, alkoxysilylene and a siloxane bond; an organometallic compound; and water (this treatment may be herein referred to as "the treatment liquid of the present invention"). The present invention further relates to a method for forming a film using the treatment liquid of the present invention, and a film-comprising metal material obtainable by using the treatment liquid of the present invention. These are described in detail below.

The alkoxysilyl is not particularly limited, as long as it contains at least one alkoxy group. Examples of alkoxysilyl groups include those represented by formula (1): $(R^1)_m(R^2O)_{3-m}Si$ (wherein $R^1$ is a functional group, $R^2$ is lower alkyl, and m is an integer of 0 to 2).

Examples of functional groups represented by $R^1$ include methyl, phenyl, hexyl, decyl, 1,6-bis(trimethoxysilyl), trifluoropropyl, vinyl, 3-glycidoxypropyl, 3-glycidoxypropyl, 2-(3,4-epoxycyclohexyl)ethyl, p-styryl, 3-methacryloxypropyl, 3-acryloxyprophyl, 3-aminopropyl, N-2-(aminoethyl)-3-aminopropyl, N-2-(aminoethyl)-3-aminopropyl, 3-[(1,3-dimethylbutylidene)amino]propyl, N-phenyl-3-aminopropyl, N-(vinylbenzyl)-2-aminoethyl-3-aminopropyl, a group obtained by removing one trimethoxysilyl group from tris-(trimethoxysilylpropyl)isocyanurate, 3-ureidopropyl, 3-mercaptopropyl, a group obtained by removing one triethoxysilyl group from bis(triethoxysilylpropyl)tetrasulfide, 3-isocyanatepropyl, and a group obtained by removing trimethoxysilyl from [3-(trimethoxysilyl)propyl]succinic anhydride.

Examples of lower alkyl groups represented by $R^2$ include linear or branched alkyl groups having about 1 to 6 carbon atoms, such as methyl, ethyl, n-propyl, isopropyl, n-butyl, isobutyl, tert-butyl, sec-butyl, n-pentyl, 1-ethylpropyl, isopentyl, and neopentyl.

The alkoxysilylene is not particularly limited, as long as it contains at least one alkoxy group. Examples of alkoxysilylene groups include those represented by formula (2): $(R^3)_n(R^4O)_{2-n}Si=$ (wherein $R^3$ is a functional group, $R^4$ is lower alkyl, and n is an integer of 0 to 1).

Examples of functional groups represented by $R^3$ may be the same as those represented by $R^1$.

Examples of lower alkyl groups represented by $R^4$ may be the same as those represented by $R^2$.

The silicon compound is not particularly limited as long as it contains, as a partial structure, at least one member selected from the group consisting of alkoxysilyl, alkoxysilylene, and a siloxane bond. Examples of silicon compounds include resins, alkoxysilane oligomers, alkoxysilanes, and the like. Among these, for example, resins are preferable.

Examples of resins include silicone resins and various resins having alkoxysilyl introduced therein (for example, acrylic resins, urethane resins, epoxy resins, polyester resins, and melamine resins). Among these, acrylic resins having alkoxysilyl introduced therein, silicone resins, and the like are preferable, and acrylic resins having alkoxysilyl introduced therein are more preferable.

The weight average molecular weight of the resin is not particularly limited. The resin may have a weight average molecular weight of, for example, 11000 to 200000, preferably 11000 to 100000, more preferably 11000 to 70000, and even more preferably 11000 to 50000.

When the resin alkoxysilyl introduced therein, the alkoxysilyl content is, for example, 1 to 70 mass %, preferably 2 to 60 mass %, more preferably 3 to 50 mass %, even more preferably 4 to 45 mass %, and still even more preferably 5 to 40 mass %.

Examples of alkoxysilanes include $Si(OCH_3)_4$, $Si(OC_2H_5)_4$, $CH_3Si(OCH_3)_3$, $CH_3Si(OC_2H_5)_3$, $C_2H_5Si(OCH_3)_3$, $C_2H_5Si(OC_2H_5)_4$, $CHCH_2Si(OCH_3)_3$, $CH_2CHOCH_2O(CH_2)_3Si(OCH_3)_3$, $CH_2C(CH_3)COO(CH_2)_3Si(OCH_3)_3$, $CH_2CHCOO(CH_2)_3Si(OCH_3)_3$, $NH_2(CH_2)_3Si(OCH_3)_3$, $SH(CH_2)_3Si(OCH_3)_3$, $NCO(CH_2)_3Si(OC_2H_5)_3$, and the like.

The alkoxysilane oligomer is obtained by hydrolyzing an alkoxysilane, and subjecting the hydrolysate to condensation polymerization. Examples of usable alkoxysilane oligomers include those having a weight average molecular weight of about 500 to 10000.

Such silicon compounds can be used singly, or in a combination of two or more.

The silicon compound content is, for example, 3 to 70 mass %, preferably 5 to 30 mass %, and more preferably 8 to 25 mass %, per 100 mass % of the treatment liquid of the present invention.

The treatment liquid of the present invention may further contain a resin not having alkoxysilyl, alkoxysilylene, or a siloxane bond (a non-silicon resin). Examples of non-silicon resins include epoxy resins, acrylic resins, urethane resins, polyester resins, melamine resins, and the like. Among these, epoxy resins are preferable, and bisphenol A epoxy resins are more preferable.

The treatment liquid of the present invention comprises, as film-forming components, a combination of a resin comprising at least one member selected from the group consisting of alkoxysilyl, alkoxysilylene, and a siloxane bond (component A); and at least one component selected from the group consisting of alkoxysilanes, alkoxysilane oligomers, and non-silicon resins (component B).

Preferable examples of component A include acrylic resins having alkoxysilyl introduced therein, silicone resins, and the like. Acrylic resins having alkoxysilyl introduced therein are more preferable.

Preferable examples of component B include non-silicon resins. Epoxy resins are more preferable, and bisphenol A epoxy resins are particularly preferable.

The content ratio of component B to component A is not particularly limited. For example, component B is used in an amount of 30 to 200 parts by mass, preferably 60 to 150 parts by mass, more preferably 80 to 120 parts by mass, and even more preferably 90 to 110 parts by mass, relative to 100 parts by mass of component A.

The organometallic compound is not particularly limited, as long as it can function as a catalyst for a condensation reaction. Examples of organometallic compounds include water-soluble organic metal chelate compounds containing, as a metal component, titanium, zirconium, aluminum, tin, or the like; metal alkoxides; and the like. Among these, examples of organic titanium compounds include titanium alkoxide compounds, such as tetraisopropyl titanate, tetra-n-butyl titanate, butyl titanate dimers, tetra-tertiary butyl titanate, and tetraoctyl titanate; titanium chelate compounds, such as titanium diisopropoxy bis(acetyl acetonate), titanium tetraacetyl acetonate, titanium dioctyloxy bis(ethyl acetoacetate), titanium octylene glycolate, titanium diisopropoxy bis(ethyl acetylacetonate), titanium lactate, titanium lactate ammonium salts, and titanium diisopropoxy bis(triethanol aminate); and the like. Examples of organic zirconium compounds include zirconium alkoxide compounds, such as n-propyl zirconate and n-butyl zirconate; zirconium chelate compounds such as zirconium tetraacetylacetonate, zirconium tributoxymonoacetylacetonate, zirconium dibutoxy bis(ethyl acetoacetate), and zirconium tributoxy monostearate. Examples of organoaluminium compounds include aluminum alkoxide compounds, such as aluminum isopropylate, monobutoxyaluminum diisopropylate, and aluminum butyrate; aluminum chelate compounds, such as ethyl acetoacetate aluminum diisopropylate, aluminum trisethyl acetate, alkyl acetoacetate aluminum diisopropylate, and aluminum monoacetyl acetonate bisethyl acetoacetate; and the like.

Such organometallic compounds can be used singly, or in a combination of two or more.

The organometallic compound content is not particularly limited. Relative to 100 parts by mass of the silicon compound, the amount of the organometallic compound may be usually about 0.01 to 50 parts by mass, preferably about 0.1 to 30 parts by mass, more preferably 1 to 30 parts by mass, even more preferably 5 to 30 parts by mass, still even more preferably 10 to 25 parts by mass, and still even more preferably 15 to 25 parts by mass.

The treatment liquid of the present invention may comprise a catalyst other than organometallic compounds. However, the treatment liquid of the present invention preferably contains no catalysts other than organometallic compounds.

The water content is not particularly limited. Relative to 100 parts by mass of the silicon compound, the amount of water is, for example, 1 to 100 parts by mass, preferably 10 to 100 parts by mass, and more preferably 20 to 100 parts by mass.

The treatment liquid of the present invention preferably contains a solvent, in addition to the components described above. The solvent may be any hydrophilic solvent. For example, organic solvents, such as alcohol, glycol, glycol ether, ether, ether alcohol, or ketone solvents, can be used singly, or in a suitable combination of two or more, as needed. Among these, glycol ether solvents are more preferable.

Examples of glycol ether solvents include solvents represented by formula (3): HO—$R^5$—O—$R^6$ (wherein $R^5$ is lower alkylene and $R^6$ is alkyl).

The lower alkylene represented by $R^5$ is not particularly limited. Examples include any linear or branched (preferably branched) lower alkylene group. The number of carbon atoms of the alkylene is, for example, 1 to 6, preferably 1 to 5, more preferably 2 to 4, and even more preferably 3. Specific examples of such alkylene groups include methylene, ethylene, n-propylene, isopropylene, n-butylene, isobutylene, and the like.

The alkyl represented by $R^6$ is not particularly limited. Examples include any linear or branched (preferably linear) alkyl group. The number of carbon atoms of the alkyl is, for example, 1 to 6, preferably 1 to 4, more preferably 1 to 2, and even more preferably 1. Specific examples of such alkyl groups include methyl, ethyl, n-propyl, isopropyl, n-butyl, isobutyl, tert-butyl, sec butyl, and the like.

The treatment liquid of the present invention may contain other components in addition to the components described above. Examples of such other components include colorants.

Usable colorants are not particularly limited. Examples include organic pigments such as azo lake, insoluble azo, condensed azo, anthraquinone, quinacridone, and phthalocyanine; inorganic pigments such as titanium oxide, red iron oxide, chrome yellow, ultramarine blue, Prussian blue, carbon black, graphite, and iron oxide black; flake pigments such as aluminium flakes, mica, color mica, silica flake, and glass flakes; extender pigments such as talc, kaolin, clay, calcium carbonate, silica, and barium sulfate; rust-preventive pigments such as zinc dust, zinc chromate, red lead, lead suboxide, strontium chromate, phosphomolybdic acid pigments, and lead cyanamide; and like various pigments.

Such colorants can be used singly, or in a combination of two or more.

The colorant content is not particularly limited. The ratio by weight of the colorant to the film-forming components is, for example, 0 to 100 wt. %, and preferably 0 to 50 wt. %.

The content of the components other than colorant is, for example, 0 to 20 mass %, preferably 0 to 10 mass %, more preferably 0 to 5 mass %, even more preferably 0 to 1 mass %, and still even more preferably 0 mass %, based on the treatment liquid of the present invention taken as 100 mass %.

The method for producing the treatment liquid of the present invention is not particularly limited. The treatment liquid can be obtained by appropriately mixing each component. The treatment liquid is preferably obtained by mixing a silicon compound optionally with a solvent; and then adding water and an organometallic compound thereto, and mixing.

The treatment liquid of the present invention may comprise the film-forming components in the state of being partially crosslinked intermolecularly and/or intramolecularly.

The application of the treatment liquid of the present invention to a metal material having a chemical conversion treatment film can form a film having corrosion resistance.

Examples of the method for applying the treatment liquid of the present invention include known methods, such as dip coating, spray coating, roll coating, spin coating, and bar coating.

After the treatment liquid of the present invention is applied, a curing treatment is preferably performed. Any curing treatment capable of curing the film-forming components in the treatment liquid of the present invention can be used without limitation. The curing treatment is preferably, for example, heat treatment.

The heat treatment temperature is not particularly limited. For example, the heat treatment is performed at 20° C. or more, preferably 50 to 300° C., more preferably 100 to 250° C., and even more preferably 150 to 250° C.

The heat treatment time is not particularly limited. For example, the heat treatment is performed for 5 minutes to 2 hours, preferably 10 minutes to 1 hour, and more preferably 20 minutes to 40 minutes.

Forming a thinner film by the treatment liquid of the present invention is preferable. For example, the obtained film has a thickness of 0.1 to 100 μm, preferably 0.5 to 50 μm, and more preferably 1 to 30 μm.

The metal material is not particularly limited, as long as at least a part of the surface of the metal material is formed of a metal. Examples of metals include various metals, such as zinc, aluminum, magnesium, cobalt, nickel, iron, copper, tin, gold, and alloys thereof. Among these, preferable metals are magnesium, magnesium alloys, aluminum, aluminum alloys, and the like. More specific examples of metal materials include articles consisting only of one or more metals; composite articles formed by a combination of at least one metal with at least one material other than metals (e.g., ceramic materials and plastic materials); plated articles comprising a metal plating film on the surface; and the like.

The chemical conversion treatment film of the metal material is, for example, preferably a silicic acid conversion treatment film, a trivalent chromium conversion treatment film, a zirconium conversion treatment film, a phosphoric acid conversion treatment film, or the like; more preferably a silicic acid conversion treatment film, a trivalent chromium conversion treatment film, a zirconium conversion treatment film, or the like; and even more preferably a silicic acid conversion treatment film.

To form a silicic acid conversion treatment film, a silicic acid conversion treatment liquid obtained by dissolving a compound capable of supplying silicate ions (a silicic acid compound) in water can be used.

The acid compound is not particularly limited, and various known silicic acid compounds can be used. Specific examples of silicic acid compounds include lithium silicate, sodium silicate, potassium silicate, ammonium silicate, choline silicate, calcium silicate, magnesium silicate, hexafluorosilicic acid, and the like. Such silicic acid compounds can be used singly, or in a combination of two or more.

The silicate ion concentration in the silicic acid conversion treatment liquid is not particularly limited. For example, the silicate ion concentration is about 0.1 g/L to 700 g/L, more preferably 1 g/L to 500 g/L, and even more preferably 10 g/L to 300 g/L.

The application of the silicic acid conversion treatment liquid to the metal material can form a silicic acid conversion film. The application method is the same as the method for applying the treatment liquid of the present invention described above. The liquid temperature of the silicic acid conversion treatment liquid is, for example, about 10 to 90° C. The time of treating the metal material with the silicic acid conversion treatment liquid is, for example, about 10 seconds to about 10 minutes.

To form a phosphoric acid conversion treatment film, a phosphoric acid conversion treatment liquid obtained by dissolving a compound capable of supplying phosphate ions (a phosphoric acid compound) in water can be used.

The phosphoric acid compound is not particularly limited, and various known phosphoric acid compounds can be used. Specific examples of phosphoric acid compounds include phosphoric acid, polyphosphoric acid, ammonium dihydrogen phosphate, diammonium hydrogen phosphate, disodium hydrogen phosphate, sodium dihydrogen phosphate, potassium dihydrogen phosphate, dipotassium hydrogen phosphate, zinc phosphate, and the like. Such phosphoric acid compounds can be used singly, or in a combination of two or more.

The silicate ion concentration in the phosphoric acid conversion treatment film is not particularly limited. For example, the silicate ion concentration is about 0.01 to 30 wt. %.

The application of the phosphoric acid conversion treatment liquid to a metal material can form a phosphoric acid conversion treatment film. The application method is the same as the method for applying the treatment liquid of the present invention described above. The liquid temperature of the phosphoric acid conversion treatment liquid is, for example, 10 to 80° C. The time of treating a metal material with the phosphoric acid conversion treatment liquid is, for example, 10 seconds to about 10 minutes.

To form a trivalent chromic acid treatment film, a trivalent chromic acid conversion treatment liquid obtained by dissolving a compound capable of supplying trivalent chromate ions (a trivalent chromic acid compound) can be used.

The trivalent chromic acid compound is not particularly limited, and various known trivalent chromic acid compounds can be used. Specific examples of trivalent chromium compounds include chromium sulfate, chromium nitrate, chromium chloride, chromium acetate, and the like. Such trivalent chromium compounds can be used singly, or in a combination of two or more.

The silicate ion concentration in the trivalent chromic acid conversion treatment liquid is not particularly limited. For example, the silicate ion concentration is about 0.1 to 100 g/L, and preferably about 0.5 to 20 g/L.

The application of the trivalent chromic acid conversion treatment liquid to a metal material can form a trivalent chromic acid conversion film. The application method is the same as the method for applying the treatment liquid of the present invention described above. The liquid temperature of the trivalent chromic acid conversion treatment liquid is, for example, about 10 to 80° C. The time of treating the metal material with the trivalent chromic acid conversion treatment liquid is, for example, about 10 seconds to about 10 minutes.

To form a zirconium conversion treatment film, a zirconium conversion treatment liquid obtained by dissolving a compound capable of supplying zirconium ions in water (a zirconium compound) can be used.

The zirconium compound is not particularly limited, and various known zirconium compounds can be used. Specific examples of zirconium compounds include zirconium sulfate, zirconium oxysulfate, ammonium zirconium sulfate, zirconium nitrate, ammonium zirconium nitrate, zirconium oxynitrate, zirconium chloride, zirconium acetate, zirconium lactate, ammonium zirconium carbonate, and the like. Such zirconium compounds can be used singly, or in a combination of two or more.

The silicate ion concentration in the zirconium compound chemical conversion treatment liquid is not particularly limited. For example, the silicate ion concentration is about 0.1 to 100 g/L, and preferably about 0.5 to 20 g/L.

The application of the zirconium conversion treatment liquid to the metal material can form a zirconium conversion film. The application method is the same as the method for applying the treatment liquid of the present invention described above. The liquid temperature of the zirconium conversion treatment liquid is, for example, about 10 to 80° C. The time of treating the metal material with the zirconium conversion treatment is, for example, about 10 seconds to about 10 minutes.

The metal material is preferably etched before forming the chemical conversion treatment film. Since the etching treatment dissolves the metal surface layer and exposes the active surface, the etching treatment is considered to promote the reaction of forming a chemical conversion treatment film.

The etching treatment liquid may be any treatment liquid capable of dissolving the metal material. Acid or alkali treatment liquids can be used. Examples of acidic treatment liquids include hydrochloric acid, nitric acid, sulfuric acid, and the like. Examples of alkaline treatment liquids include sodium hydroxide, potassium hydroxide, and the like.

The etching treatment conditions are not particularly limited. Any method that allows the metal material to be treated to be sufficiently contacted with the treatment liquid can be used. An efficient treatment can be usually performed by a method of immersing the metal material in the treatment liquid. The treatment conditions are not particularly limited. For example, when an immersion method is used for the treatment, the liquid temperature of the treatment liquid may be set to about 10 to 90° C., and the immersion deposition time may be set to about 5 seconds to about 10 minutes.

When an etched metal material is used, the metal material is preferably desmutted after the etching treatment. The metal surface after etching treatment has attached thereto the smut of insoluble metal residue, i.e., impurities; and is usually subjected to a desmutting treatment. The expected effect of the desmutting treatment is that a uniform metal surface can be formed by removing the metal not dissolved by etching, and residue smut, such as impurities, thus enabling the formation of a defect-free chemical conversion film.

The desmutting treatment liquid may be any treatment liquid capable of dissolving an insoluble metal. Acid or alkali treatment liquids can be used. Examples of acidic treatment liquids include hydrochloric acid, nitric acid, sulfuric acid, and the like. Examples of alkaline treatment liquids include sodium hydroxide, potassium hydroxide, and the like. The pH of the etching liquid is usually opposite to the pH of the desmutting liquid. When the etching liquid is acidic, the desmutting liquid is often alkaline. When the etching liquid is alkaline, the desmutting liquid is often acidic. However, the desmutting liquid that can be used is not limited thereto.

The desmutting treatment conditions are not particularly limited. Any method that allows the metal material to be treated to be sufficiently contacted with the treatment liquid can be used. In general, an efficient treatment can be usually performed by a method of immersing a metal material in the treatment liquid. The treatment conditions are not particularly limited. For example, when an immersion method is used for the treatment, the liquid temperature of the treatment liquid may be set to about 10 to 90° C., and the immersion deposition time may be set to about 5 seconds to about 10 minutes.

The treatments described above can provide a metal material provided with a corrosion-resistant film. More specifically, the above treatments can provide a film-comprising metal material comprising: a metal material; a film 1 formed on the metal material; and a film 2 formed on the film 1, wherein the film 1 is a chemical conversion treatment film, and the film 2 is a film comprising a crosslinked structure of a silicon compound comprising at least one member selected from the group consisting of alkoxysilyl, alkoxysilylene, and a siloxane bond.

EXAMPLES

The present invention is described below in more detail with reference to Examples. However, the scope of the invention is not limited to these Examples.

Example 1

A mixture of 10 mass % of an acrylic silicone resin (weight average molecular weight: about 20,000, alkoxysilyl content: 40 mass %), 10 mass % of a bisphenol A epoxy resin, and 80 mass % of propylene glycol monoethyl ether was prepared. Subsequently, 3 parts by mass of water and 2 parts by mass of aluminum monoacetylacetonate bis(ethyl acetoacetate) were added to 100 parts by mass of the mixture to prepare a film-forming treatment liquid.

A metal material (magnesium alloy AZ91 substrate (size: 100×60×0.3 mm)) was subjected to a phosphoric acid conversion treatment by immersion for 3 minutes in a 50 g/L aqueous solution of sodium phosphate adjusted to a temperature of 60° C.

The film-forming treatment liquid prepared above was sprayed over the obtained metal material having a phosphoric acid conversion treatment film, and heat treatment was performed at 200° C. for 30 minutes using a dryer to form a film.

Example 2

The procedures were performed in the same manner as in Example 1, except that the metal material was subjected to a zirconium conversion treatment in place of the phosphoric acid conversion treatment. The zirconium conversion treatment was performed by immersing the metal material for 1 minute in a 100 g/L aqueous solution of ammonium zirconium nitrate.

Example 3

The procedures were performed in the same manner as in Example 1, except that the metal material was subjected to a trivalent chromium conversion treatment in place of the phosphoric acid conversion treatment. The trivalent chromium conversion treatment was performed by immersing the metal material for 1 minute in a 100 g/L aqueous solution of trivalent chromium nitrate adjusted to a temperature of 40° C.

Example 4

The procedures were performed in the same manner as in Example 1, except that the metal material was subjected to a silicic acid conversion treatment in place of the phosphoric acid conversion treatment. The silicic acid conversion treatment was performed by immersing the metal material for 3 minutes in a 100 g/L aqueous solution of sodium silicate (water glass No. 3) adjusted to a temperature of 60° C.

Example 5

The procedures were performed in the same manner as in Example 4, except that a film-forming treatment liquid of a different composition was used. The film-forming treatment liquid used in this Example was prepared as follows. A mixture consisting of 20 mass % of silicone resin (produced by Shin-Etsu Chemical Co., Ltd., weight average molecular weight: about 11,000 to 100,000), 10 mass % of a methyltrimethoxysilane oligomer, and 70 mass % of propylene glycol monomethyl ether was prepared. Subsequently, 10 parts by mass of water and 5 parts by mass of titanium diisopropoxy bis(ethyl acetylacetonate) were added to 100 parts by mass of the mixture to prepare a film-forming treatment liquid.

Example 6

The procedures were performed in the same manner as in Example 4, except that the metal material was subjected to etching and desmutting treatments before the silicic acid conversion treatment. The etching treatment was performed by immersing the metal material for 30 seconds in a 100 g/L aqueous solution of nitric acid adjusted to 50° C. The desmutting treatment was performed by immersing the etched metal material for 3 minutes in a 100 g/L aqueous solution of sodium hydroxide adjusted to a temperature of 20° C.

Comparative Example 1

The procedures were performed in the same manner as in Example 1, except that the metal material was degreased with an alkali in place of the phosphoric acid conversion treatment. The alkali degreasing treatment was performed by immersing the metal material in a 10 g/L aqueous solution of sodium hydroxide.

Example 7

The procedures were performed in the same manner as in Example 1, except that an aluminum alloy A5052 substrate (size: 100×50×0.2 mm) was used in place of the magnesium alloy AZ91 substrate as a metal material.

Example 8

The procedures were performed in the same manner as in Example 2, except that an aluminum alloy A5052 substrate (size: 100×50×0.2 mm) was used in place of the magnesium alloy AZ91 substrate as a metal material.

Example 9

The procedures were performed in the same manner as in Example 3, except that an aluminum alloy A5052 substrate (size: 100×50×0.2 mm) was used in place of the magnesium alloy AZ91 substrate, as a metal material.

Example 10

The procedures were performed in the same manner as in Example 4, except that an aluminum alloy A5052 substrate (size: 100×50×0.2 mm) was used in place of the magnesium alloy AZ91 substrate as a metal material.

Example 11

The procedures were performed in the same manner as in Example 5, except that an aluminum alloy A5052 substrate (size: 100×50×0.2 mm) was used in place of the magnesium alloy AZ91 substrate as a metal material.

Example 12

The procedures were performed in the same manner as in Example 6, except that an aluminum alloy A5052 substrate (size: 100×50×0.2 mm) was used in place of the magnesium alloy AZ91 substrate as a metal material, and the etching and desmutting treatment methods were changed accordingly. In this Example, the etching treatment was performed by immersing the metal material for 30 seconds in a 100 g/L aqueous solution of sodium hydroxide adjusted to a temperature of 50° C. The desmutting treatment was performed by immersing the etched metal material for 3 minutes in a 50 g/L aqueous solution of nitric acid adjusted to a temperature of 60° C.

Comparative Example 2

The procedures were performed in the same manner as in Comparative Example 1, except that an aluminum alloy A5052 substrate (size: 100×50×0.2 mm) was used in place of the magnesium alloy AZ91 substrate as a metal material.

Test Example 1: Corrosion Resistance Test

The film-comprising metal materials obtained in Examples 1 to 12 and Comparative Examples 1 and 2 described above were tested for corrosion resistance by a hot-water immersion test (immersed in 100° C. hot water). Each film-comprising metal material was immersed in 100° C. hot water. The time from the start of the immersion until the rusting area accounted for 10% of the surface area of the film-comprising metal material was measured. Table 4 shows the test results.

TABLE 1

| | Pretreatment | Metal material | Corrosion resistance test results (Rust development time) |
|---|---|---|---|
| Example 1 | Phosphoric acid conversion treatment | Magnesium alloy | 3 hours |
| Example 2 | Zirconium conversion treatment | | 9 hours |
| Example 3 | Trivalent chromium conversion treatment | | 9 hours |
| Example 4 | Silicic acid conversion treatment | | 12 hours |
| Example 5 | Silicic acid conversion treatment | | 12 hours |
| Example 6 | Etching treatment, Desmutting treatment, stilicic acid conversion treatment | | 24 hours |
| Comparative Example 1 | Degreasing treatment | | 1 hours |
| Example 7 | Phosphoric acid conversion treatment | Aluminum alloy | 36 hours |
| Example 8 | Zirconium conversion treatment | | 48 hours |
| Example 9 | Trivalent chromium conversion treatment | | 48 hours |
| Example 10 | Silicic acid conversion treatment | | 48 hours |
| Example 11 | Silicic acid conversion treatment | | 48 hours |
| Example 12 | Etching treatment, Desmutting treatment, Silicic acid conversion treatment | | 96 hours |
| Comparative Example 2 | Degreasing treatment | | 24 hours |

The above results clearly show that forming a film by application of the treatment liquid of the present invention to a metal material having a chemical conversion treatment film can enhance the corrosion resistance.

The invention claimed is:

1. A film formation method comprising
   step D of applying a film-forming treatment liquid to a metal material having a silicic acid conversion treatment film, and
   step C of applying a silicic acid conversion treatment liquid to a metal material before step D to obtain the metal material having a silicic acid conversion treatment film,
   (a) the film-forming treatment liquid comprising:
   a silicon compound comprising a resin, wherein the resin comprises at least one member selected from the group consisting of alkoxysilyl, alkoxysilylene, and a siloxane bond, and wherein the resin has a weight average molecular weight of 11000 to 200000;
   a non-silicon resin, wherein the non-silicon resin is selected from the group consisting of epoxy resins, urethane resins, polyester resins and melamine resins;
   an organometallic compound; and water, and
   (b) the silicic acid conversion treatment liquid comprising at least one silicic acid compound selected from the group consisting of lithium silicate, sodium silicate, potassium silicate, ammonium silicate, choline silicate, calcium silicate, magnesium silicate, and hexafluorosilicic acid,
   (c) the silicate ion concentration in the silicic acid conversion treatment liquid is 10 g/L to 700 g/L.

2. The formation method according to claim 1, further comprising
   step A of etching the surface of the metal material before step C.

3. The formation method according to claim 2, further comprising
   step B of desmutting the metal material between step A and step C.

4. The formation method according to claim 1, further comprising
   step E of curing after step D.

5. The formation method according to claim 4, wherein the curing is a heat treatment.

6. The formation method according to claim 1, wherein a metal of the organometallic compound is at least one member selected from the group consisting of titanium, zirconium, aluminum, and tin.

7. The formation method according to claim 1, wherein the organometallic compound content in the film-forming treatment liquid is 0.01 to 50 parts by mass, relative to 100 parts by mass of the silicon compound.

8. The formation method according to claim 1, wherein the water content in the film-forming treatment liquid is 1 to 100 parts by mass, relative to 100 parts by mass of the silicon compound.

* * * * *